United States Patent [19]

Jansen

[11] Patent Number: 4,861,493

[45] Date of Patent: * Aug. 29, 1989

[54] PROCESS FOR THE REMOVAL OF METALS, IN PARTICULAR HEAVY METALS, FROM WASTE WATER

[75] Inventor: Cornelis W. Jansen, Amersfoort, Netherlands

[73] Assignee: DHV Raadgevend Ingenieursbureau BV, Netherlands

[*] Notice: The portion of the term of this patent subsequent to Aug. 16, 2005 has been disclaimed.

[21] Appl. No.: 152,319

[22] Filed: Feb. 4, 1988

[30] Foreign Application Priority Data

Feb. 27, 1987 [NL] Netherlands ................ 8700498

[51] Int. Cl.$^4$ .................................. C02F 1/52
[52] U.S. Cl. .................................. 210/715; 210/724; 210/912; 210/914; 423/561.1; 423/566.1
[58] Field of Search ............ 210/714, 715, 724, 726, 210/912-914; 423/561 R, 561 B

[56] References Cited

U.S. PATENT DOCUMENTS

| | | | |
|---|---|---|---|
| 3,579,443 | 5/1971 | Horst | 210/715 |
| 3,654,428 | 7/1972 | Dean et al. | 210/914 |
| 3,740,331 | 6/1973 | Anderson et al. | 210/726 |
| 3,869,381 | 3/1975 | Graveland et al. | 210/715 |
| 4,046,683 | 9/1977 | Tsunoda et al. | 210/715 |
| 4,102,784 | 7/1978 | Schlauch | 210/912 |
| 4,278,539 | 7/1981 | Santhanam et al. | 423/140 |
| 4,432,880 | 2/1984 | Talbot | 210/727 |
| 4,764,284 | 8/1988 | Jansen | 210/912 |

*Primary Examiner*—Peter Hruskoci
*Attorney, Agent, or Firm*—Kane, Dalsimer, Sullivan, Kurucz, Levy, Eisele and Richard

[57] ABSTRACT

Process for the removal of metals, in particular heavy metals and strontium, from waste water in the form of their sulfide by mixing the waste water with a water soluble sulfide. According to the invention the metal containing waste water is thoroughly mixed with the water soluble sulfide at a suitable pH in a reactor of the fluidized bed type, which is provided with an appropriate bed material, on which the metal sulfide crystallizes out, whereby the thus obtained bed material provided with crystalline metal sulfide is removed from and new bed material is added to the reactor from time to time. Usually as water soluble sulfide an alkali metal sulfide or alkali metal hydrogen sulfide or ammonium sulfide or FeS is used, whereas the use of sodium sulfide, sodium hydrogen sulfide, potassium sulfide or potassium hydrogen sulfide is preferred. According to the present process a.o. the following metals: Ni, Sr, Zn, Cu, Fe, Ag, Pb, Cd, Hg, Co, Mn, Te, Sn, In, Bi or Sb may be removed.

7 Claims, 1 Drawing Sheet

PROCESS FOR THE REMOVAL OF METALS, IN PARTICULAR HEAVY METALS, FROM WASTE WATER

The invention relates to a process for the removal of metals, in particular heavy metals and strontium, from waste water in the form of their sulfide by mixing the waste water with a water soluble sulfide.

The removal of metals from waste water may for example be realized by mixing the metal containing waste water with for example sodium hydrogen sulfide (NaHS), whereby the metal sulfide precipitates.

A process of this kind may for instance be carried out with the application of the so called Funda filter system, which consists of two reactor tanks and a separator tank. In the first reactor tank hydrochloric acid and NaHS are added to the waste water to be treated, whereby the metal precipitates in the form of its sulfide at a suitable pH. The hereby formed flocky precipitate is transferred to the second reactor tank, in order to promote the growth of the metal sulfide flocks. Thereafter the thus treated metal sulfide flocks are separated in the separator tank from the waste water in the form of a voluminous mud containing much water, which mud should be drastically freed from water prior to the storage or the metal recovery therefrom.

It has been found that the waste water treated according to the known process still contains a too high concentration of solved metal. Usually the concentration of mercury in the thus treated waste water for instance amounts to 20–100 ppb, whereas in certain countries the concentration of mercury in waste water should be below 5 ppb before it may be disposed of.

Moreover the known process is expensive, laborious and takes up much space.

It is an object of the invention to provide a process, with which the above-mentioned disadvantages are effectively removed.

For this purpose the process according to the invention is characterized in that the metal containing waste water is thoroughly mixed with the water soluble sulfide at a suitable pH in a reactor of the fluidized bed type, which is provided with an appropriate bed material, on which the metal sulfide crystallizes out, whereby the thus obtained bed material provided with crystalline metal sulfide is removed from and new bed material is added to the reactor from time to time.

The process according to the invention is particularly suitable for the removal of heavy metals from waste water, whereas moreover the disadvantages of the known process are effectively removed.

The removal of for example mercury as heavy metal according to the present invention may take place quickly, i.e. within a few minutes, whereas the concentration of mercury in the treated waste water is below 5 ppb, which is considerably lower than with the known process.

Another advantage of the present process is that a pellet product is obtained with a very low water content of about 0.5%. The thus obtained pellet material may be used without having to be further freed from water for various industrial applications, among which for the recovery of mercury, which is an expensive metal.

Moreover because of the low water content the volume of the formed pellets appears to be about a factor 50 lower than the sludge obtained according to the known process.

An essential aspect of the present process is that the work is done under such circumstances, that the bed material is in a fluidized condition, because of which an exclusive crystallization of the metal sulfide takes place to or in the bed material.

According to the invention as water soluble sulfide an alkali metal sulfide or alkali metal hydrogen sulfide or ammonium sulfide or FeS is used.

Usually according to the invention $Na_2S$, NaHS, $K_2S$ or KHS is used, although NaHS is preferred.

The process according to the invention should take place in the reactor at a pH of 4–10 and preferably at a pH of 4–5.

The pH of the waste water in the reactor should be below 10, as at a higher pH the possibility of forming soluble polysulfide complexes increases, which is undesirable. Moreover amorphous metal hydroxide is formed.

On the other hand the pH of the waste water in the reactor should be higher than 3, because otherwise the sulfide will form hydrogen sulfide.

The desired pH is adjusted with acid or lye.

According to the invention with advantage sand is used as bed material, preferably with a grain size of 0.1–0.3 mm.

It is observed, that the sand grains with the mentioned particle size of 0.1–0.3 mm may grow to a particle size of 1–3 mm, which grains are removed from the reactor from time to time.

From the thus removed grains the metal may be recovered in the usual way.

The grown grains which have been removed from time to time should be periodically replenished, in order to ensure the maintenance of a well functioning fluidized bed, which is essential for the present process.

According to the process of the invention as metal Ni, Sr, Zn, Cu, Fe, Ag, Pb, Cd, Hg, Co, Mn, Te, Sn, In, Bi or Sb is removed.

Figure 1:
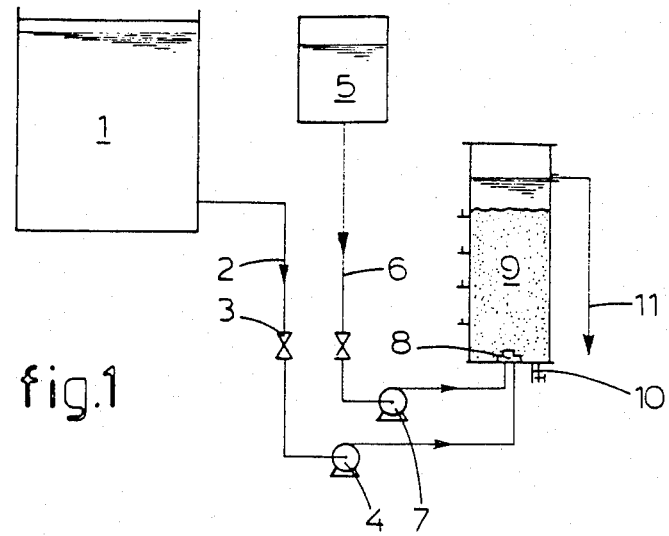
FIGS. 1 and 2 show an apparatus for performing the instant process.
Figure 2:
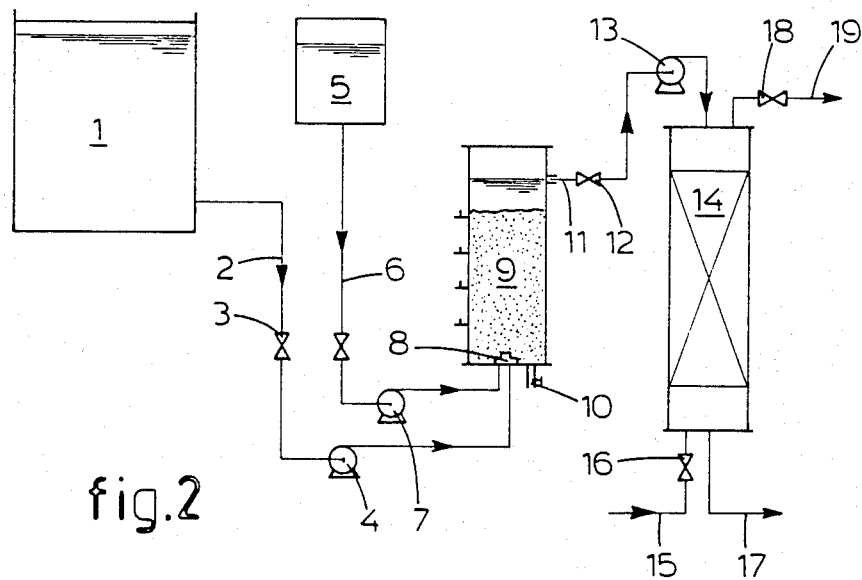

The process according to the invention with which mercury, which is a heavy metal, is removed, will now be elucidated with reference to FIGS. 1 and 2.

The waste water to be treated is for instance originating from chloride producing plant and has the following composition:

| | | | |
|---|---|---|---|
| $Hg^{2+}$ = | 5–20 ppm | $SO_4^{2-}$ = | 10–1.000 ppm |
| $Ca^{2+}$ = | 30–3.000 ppm | $Cl_2$ = | 1–500 ppm |
| $Mg^{2+}$ = | 10–300 ppm | $ClO^-$ = | 1–200 ppm |
| $Fe^{2+}$ = | 10–400 ppm | SS = | 10–200 ppm |
| $Cl^-$ = | 10,000–70,000 ppm | pH = | 10–13 |
| $CO_3^{2-}$ = | 10–200 ppm | T = | 30–35° C. |

EXAMPLE I

Waste water with the above mentioned composition was treated according to the process of the invention at ambient temperature, while using the apparatus shown in FIG. 1. The waste water was stored in tank 1 and from there led into the fluidized bed reactor 9 through conduit 2, valve 3 and pump 4. An aqueous NaHS solution was also pumped from tank 5 through conduit 6 and pump 7 into reactor 9. In the case of sufficient gravity of respectively the waste water and NaHS the pumps 4 and 7 are superfluous. Both the waste water and the aqueous NaHS solution were brought into the reactor 9 by means of the distributor 8, in such a way, that the inlet openings are not blocked. The inlet velocity of both liquids is such, that the bed material present in the reactor 9, in this case sand grains with a particle size of 0.1–0.3 mm, was brought and maintained in fluidized condition.

The formed mercury sulfide crystallizes out at the surface of the sand grains, which sand grains hereby increase to a particle size of 1–3 mm. From time to time these grains were removed from the reactor through discharge opening 10. Finally the thus treated waste water, which only contained 20–55 ppb mercury, was discharged through conduit 11.

Because the solubility product of mercury sulfide at a pH of 4–6 was very small the mercury could be selectively removed. Because the waste water contained chlorine and hypochlorite, a reaction took place with the sulfide, which meant, that the sulfide had to be added in excess. If the sulfide was added in excess, in addition to HgS moreover CaS, FeS and MgS were formed.

Because of the fluctuating concentration of mercury in the waste water and in connection with the saving of reagenita the dosage of the water soluble sulfide was preferably regulated through redox potential.

EXAMPLE II

The procedure of example I was repeated on the understanding that the waste water treated according to the present invention was subjected to an after-treatment in a sand-filter prior to disposal.

Because of the occurring friction of the sand grains which are provided with mercury sulfide, in the reactor mercury sulfide grit may be formed. This grit may be carried along in suspended form with the treated waste water, which may not be desired. In order to prevent this advantageously use was made of a filter column 14, which connected to the reactor 9 as shown in FIG. 2. The thus treated waste water with the grit, if any, present therein, was led in the filter column 14 through conduit 11, valve 12 and pump 13, which filter column was filled with sand with a diameter of 0.5–0.6 mm or, in connection with a better pressure build-up, with a mixture of anthracite with a particle size of 1.6–2.5 mm and sand with a particle size of 0.8–1.2 mm.

After passing through the filter column 14 the filtered waste water was discharged through conduit 17. The thus treated waste water has a mercury content of 2 ppb and in addition is free from the said grit.

The filter column 14 may be rinsed from time to time through conduit 15 and valve 16, whereby the rinsing water is discharged through conduit 19 and valve 18.

Alternatively a similar filter may in addition be placed between the neutralization tank 1 and the reactor 9 for collecting solid components present in the waste water to be treated before the waste water arrives in the reactor 9.

I claim:

1. Process for the removal of metals selected from the group consisting of heavy metals and Sr, from a metal containing water in the form of their sulfide comprising, thoroughly mixing the metal containing water with an effective amount of an aqueous sulfide solution at a pH of about 4–10 said mixing occurring in a reactor with a fluidized bed of a suitable material upon which the metal crystallizes exclusively in the form of metal sulfide into the crystal lattice of the bed material and the metal sulfide crystals grow in substantially pure form on the bed material to form granules having a water content of about 0.5%, separating purified water from said reactor, and removing said granules from the reactor periodically.

2. The process according to claim 1, wherein said aqueous sulfide solution contains an alkali metal sulfide or alkali metal hydrogen sulfide or ammonium sulfide or FeS.

3. Process according to claim 1 or 2, wherein said aqueous sulfide solution contains, sodium sulfide, sodium hydrogen sulfide, potassium sulfide or potassium hydrogen sulfide.

4. The process according to claims 1, 2 or 3 wherein the pH of the mixture is maintained at a value between 4 and 5.

5. Process according to claim 1, wherein said bed material is sand.

6. Process according to claim 5, wherein said sand has a grain size of 0.1–0.3 mm.

7. Process according to claim 1 Ni, Sr, Zn, Cu, Fe, Ag, Pb, Cd, Hg, Co, Mn, Te, Sn, In, Bi, or Sb is removed.

* * * * *